US007900542B2

(12) United States Patent
Kapolnek

(10) Patent No.: US 7,900,542 B2
(45) Date of Patent: Mar. 8, 2011

(54) KNIFE ASSEMBLY FOR ROTARY CUTTING SYSTEM

(75) Inventor: Paul G. Kapolnek, Chicago, IL (US)

(73) Assignee: Western Printing Machinery Company, Schiller Park, IL (US)

( * ) Notice: Subject to any disclaimer, the term of this patent is extended or adjusted under 35 U.S.C. 154(b) by 227 days.

(21) Appl. No.: 10/966,127

(22) Filed: Oct. 15, 2004

(65) Prior Publication Data

US 2005/0081696 A1 Apr. 21, 2005

Related U.S. Application Data

(60) Provisional application No. 60/513,083, filed on Oct. 20, 2003.

(51) Int. Cl.
*B24D 25/12* (2006.01)
*B26D 7/26* (2006.01)
*B23D 35/00* (2006.01)

(52) U.S. Cl. ..................... 83/343; 83/698.41; 83/698.61; 83/699.11; 83/699.61

(58) Field of Classification Search ............... 83/698.41, 83/698.51, 698.61, 699.11, 699.31, 699.41, 83/699.51, 699.61, 343
See application file for complete search history.

(56) References Cited

U.S. PATENT DOCUMENTS

| | | | | |
|---|---|---|---|---|
| 1,636,267 | A * | 7/1927 | Williams | 83/344 |
| 2,034,161 | A | 3/1936 | Theil | |
| 2,098,159 | A * | 11/1937 | Peiseler | 83/679 |
| 3,106,121 | A | 10/1963 | Novick | |
| 3,128,663 | A | 4/1964 | Dovey | |
| 3,555,948 | A | 1/1971 | Olson | |
| 3,703,117 | A * | 11/1972 | Matthews | 83/677 |
| 3,752,042 | A | 8/1973 | Castille | |
| 3,779,123 | A | 12/1973 | Chafee | |
| 3,822,625 | A * | 7/1974 | Obenshain | 83/342 |
| 3,857,314 | A | 12/1974 | Gregoire | |
| 3,893,359 | A | 7/1975 | Gregoire | |
| 3,954,050 | A | 5/1976 | Grobman | |
| 4,020,724 | A | 5/1977 | Quinlan | |
| 4,037,501 | A | 7/1977 | Gladow | |
| 4,073,485 | A | 2/1978 | Gregoire et al. | |
| 4,113,243 | A | 9/1978 | Gregoire et al. | |
| 4,295,400 | A | 10/1981 | Larson | |
| 4,335,316 | A | 6/1982 | Glanz et al. | |
| 4,335,634 | A | 6/1982 | Larson | |
| 4,338,087 | A | 7/1982 | Gregoire | |
| 4,409,870 | A | 10/1983 | Rynik et al. | |

(Continued)

FOREIGN PATENT DOCUMENTS

DE 35 11 580 A1 10/1986

(Continued)

*Primary Examiner* — Ghassem Alie
*Assistant Examiner* — Bharat C Patel
(74) *Attorney, Agent, or Firm* — Brinks Hofer Gilson & Lione

(57) ABSTRACT

A knife holder assembly for a rotary cutting machine includes a holder with a top portion and side portion each including an opening, and an adjusting member with a top portion and side portion each including an opening. The inner side portion of the holder is tapered at an angle substantially the same as the side portion of the adjusting member. A fastener can be inserted through the top portion opening of the holder and the top portion opening of the adjusting member thereby moving the adjusting member in a direction away from the outer side portion of the holder to clamp an inserted knife between the backing portion and the outer side portion of the holder.

19 Claims, 9 Drawing Sheets

U.S. PATENT DOCUMENTS

| | | | | |
|---|---|---|---|---|
| 4,412,467 | A | 11/1983 | DeSanto | |
| 4,421,501 | A | 12/1983 | Scheffer | |
| 4,463,640 | A | 8/1984 | Cogswell et al. | |
| 4,475,425 | A | 10/1984 | Punater et al. | |
| 4,640,165 | A | 2/1987 | McMahon et al. | |
| 4,700,481 | A | 10/1987 | Barrett | |
| 4,799,414 | A | 1/1989 | Scheffer et al. | |
| 4,846,030 | A | 7/1989 | McMahon et al. | |
| 4,854,204 | A | 8/1989 | Faltin | |
| 4,896,573 | A | 1/1990 | Kapolnek | |
| 4,920,843 | A * | 5/1990 | Stromberg et al. | 83/346 |
| 4,962,683 | A | 10/1990 | Scheffer et al. | |
| 5,007,890 | A | 4/1991 | Alventh et al. | |
| 5,088,975 | A | 2/1992 | Ghilardi | |
| 5,146,831 | A | 9/1992 | Fetter, Jr. et al. | |
| 5,193,425 | A | 3/1993 | Campbell, Jr. et al. | |
| 5,271,442 | A | 12/1993 | Carpenter et al. | |
| 5,282,409 | A | 2/1994 | Rojas | |
| 5,334,129 | A | 8/1994 | Haller | |
| 5,596,867 | A * | 1/1997 | Davis | 53/554 |
| 5,893,314 | A * | 4/1999 | Kapolnek et al. | 83/698.41 |

FOREIGN PATENT DOCUMENTS

| | | |
|---|---|---|
| EP | 0 800 898 A | 10/1997 |
| GB | 1048301 | 11/1966 |

* cited by examiner

KNIFE ASSEMBLY FOR ROTARY CUTTING SYSTEM

CROSS-REFERENCE TO RELATED APPLICATIONS

This application is a non-provisional application which claims priority of provisional application Ser. No. 60/513,083, filed Oct. 20, 2003.

BACKGROUND OF THE INVENTION

The invention relates generally to rotary cutters for cutting web or sheet material, and more particularly to a knife holder apparatus which may be attached to a knife cylinder and employed with an associated anvil cylinder to transversely cut or score a moving web or sheet.

It is conventional practice to use a rotary cutter to transversely cut web material received from a printing press. In general, rotary cutters have an anvil cylinder and a knife cylinder which are rotatable in timed relation. One or more knife holders, which hold the cutting knives, are attached to the knife cylinder. The knife and anvil cylinders normally rotate at the same speed and the moving paper or web material is transversely cut or scored as the cutting knife moves into and out of engagement with the anvil surface. The cutting knives may be spaced apart to create the desired cut.

In the conventional rotary cutter, knife replacement is a time-consuming operation. Moreover, because of the increased use of recycled paper and its negative effect on the life of the cutting knife, reducing the time required for the knife replacement operation has become even more important.

To reduce down time due to blade replacement, unitary epoxy knife holder and blade assemblies have been employed. An example of a unitary epoxy knife holder and blade assembly 112 is shown in FIG. 10. Replacement of a worn cutting knife of this type, however, requires that the entire assembly be removed from the knife cylinder, which requires stripping away the cushioning and rubber material which is placed over the knife cylinder and portions of the holder. The installer must then realign and remount the replacement holder on the knife cylinder.

To avoid the above-mentioned problems associated with unitary knife holder and blade assemblies, the knife holder assembly as shown in FIG. 11 has been developed. This knife holder assembly includes a metal holder 116 and a backing member 110, which locks a cutting rule 114 to the holder 116 with holding screws 118. Although this knife holder assembly does not require the complete removal of the holder 116 from the knife cylinder, it does require some of the cushioning material to be stripped back because the release screws 118 are located on the side of the holder. This requires the person changing the cutting rule 114 to loosen the holding screws 118 from the side of the holder, which is both awkward and time consuming.

U.S. Pat. No. 5,893,314 discloses an improved knife holder assembly that overcomes some of the problems associated with the knife holder assembly shown in FIG. 11. An example of this type of improved knife holder assembly is shown in FIG. 12. This knife holder assembly 200 includes a holder 202, and an adjusting member 204 that allows the operator to replace the knife 206 by loosening the fasteners 208 from the top portion of the holder. This eliminates the need to pull back or remove the cushioning material to get at side mounted fasteners 212. However, this apparatus requires a significant number of screws to adequately secure the multiple adjusting members. This apparatus is also expensive to manufacture.

It would be desirable to have an uncomplicated and inexpensive knife holder assembly that would allow the user to quickly and efficiently remove the worn cutting knife and replace it without removing the holder from the knife cylinder.

BRIEF SUMMARY

The invention provides a knife holder apparatus and method of operating the same. The knife holder apparatus includes a holder, a backing bar and an adjusting member. The holder includes a slot opening through its top portion and an opening through its side portion. The backing bar includes an opening through its side portion. The adjusting member includes a tapered side portion substantially parallel to the inner side portion of the holder, and a body portion which includes a top portion opening to allow a fastener to be inserted through the top portion thereby moving the adjusting member up and away from the outer side portion of the holder. The backing bar, connected to the adjusting member, is drawn toward the side portion of the holder to clamp an inserted knife between the backing portion and an outer side portion of the holder, and to allow a fastener to be retracted to allow the backing portion to be moved away from the outer side portion of the holder to release the knife.

This design allows the operator to replace the knife by simply loosening or removing the fastener or fasteners from the top portion of the holder. This eliminates the need to pull back or remove the cushioning material to get at side mounted fasteners or screws and thereby reduces downtime. This design also reduces the number of screws and adjusting members required to secure the knife.

The invention further provides other features which include the following: the slot opening formed through the top portion of the holder allows the holder to be fastened to a knife cylinder; the fastener being screwably attached to the top portion of the adjusting member; the above apparatus further including a knife for inserting between the backing member and the outer side portion of the holder; the above apparatus further including a fastener for inserting through the top portion opening of the holder; and the fastener being a screw and the top portion opening of the adjusting member having threaded sidewalls for receiving the screw.

The invention further provides other features which include the following: an opening formed through the outer side portion of the holder to allow a fastener to pass through the backing bar to the adjusting member; the fastener being a screw and the side portion opening of the adjusting member having threaded sidewalls for receiving the screw; and a threaded insert for receiving the screw when it extends through the adjusting member. The invention further provides for a resilient strip, for example, a urethane strip adapted to be positioned adjacent a knife and clamped between the backing member and side portion of the holder. The urethane has been shown to increase the blade life.

The features of the invention are aimed at providing a knife holder assembly that is inexpensive, easy to manufacture, easy to maintain, and overcomes one or more of the problems stated in the “Background of the Invention”. The adjusting member and the holder openings are designed to allow one knife or two knives to be easily inserted and removed from the holder assembly. By use of the additional knife and spacer, or by positioning two separate holders back to back on the knife cylinder, any desired distance between the knives can be achieved.

The invention further provides for a method of operating a knife holder. A knife or cutting rule is inserted between a side portion of a holder and a backing bar. A fastener is then inserted through an opening formed in a top portion of the holder to contact with a top portion opening in the adjusting member. This contact moves the adjusting member in a direction away from the outer side portion of the holder, drawing the backing bar toward the outer side portion of the holder. The knife is thereby clamped between the outer side portion of the holder and the backing bar. Alternatively, prior to inserting or tightening the fastener, a urethane strip may be inserted on both sides of said knife. A spacer and a second knife may also be inserted adjacent the first knife. And, again, a urethane strip may be inserted on both sides of each knife.

These and other features and advantages of the present invention will become apparent to those skilled in the art upon review of the following detailed description of the presently preferred embodiments of the invention taken in conjunction with the accompanying drawings.

DETAILED DESCRIPTION OF THE DRAWINGS AND THE PRESENTLY PREFERRED EMBODIMENTS

Figure 1:
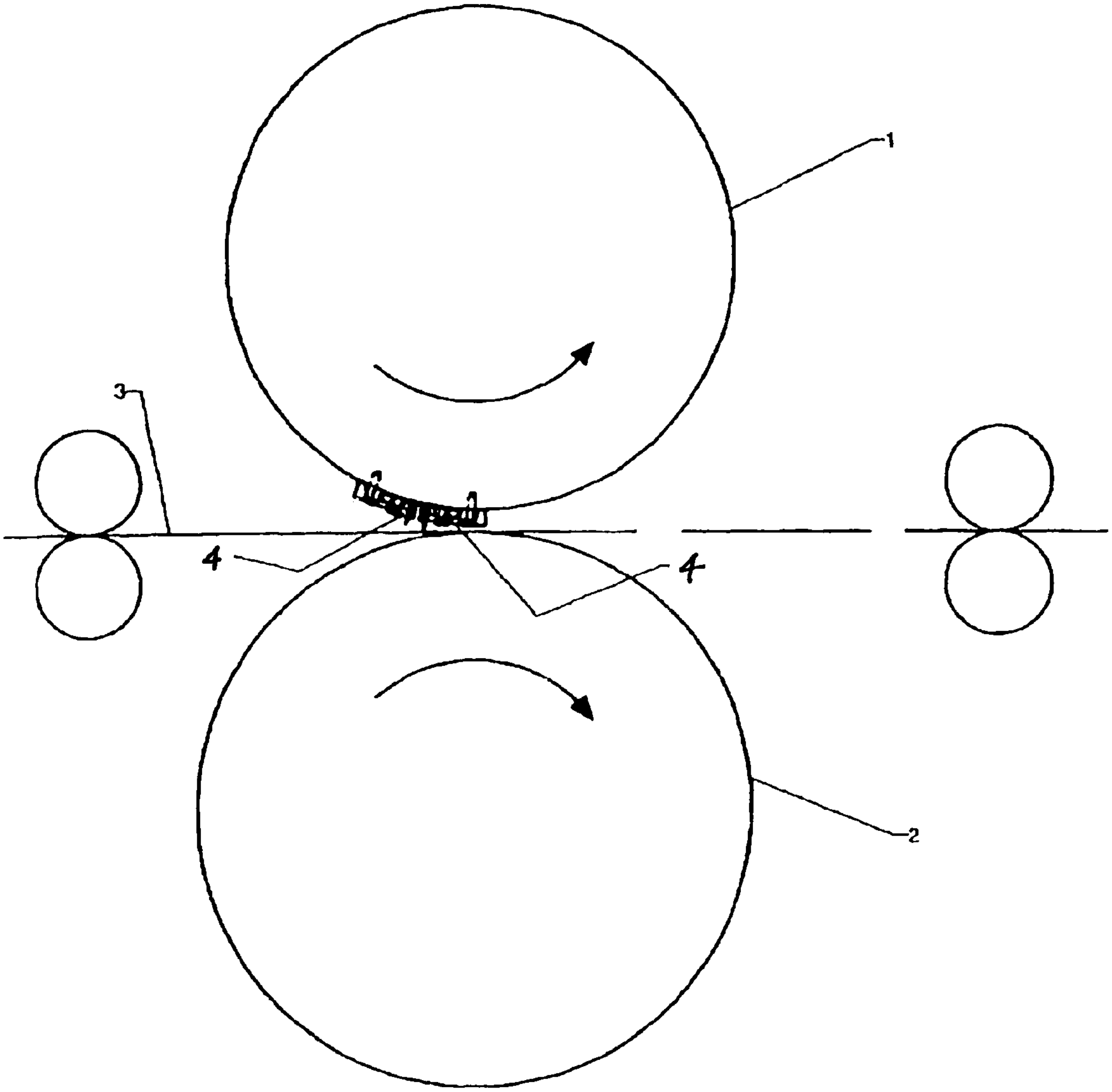
FIG. 1 is a schematic view of a rotary cutter with an embodiment of the knife holders according to the invention mounted on the knife cylinder.
Figure 2:
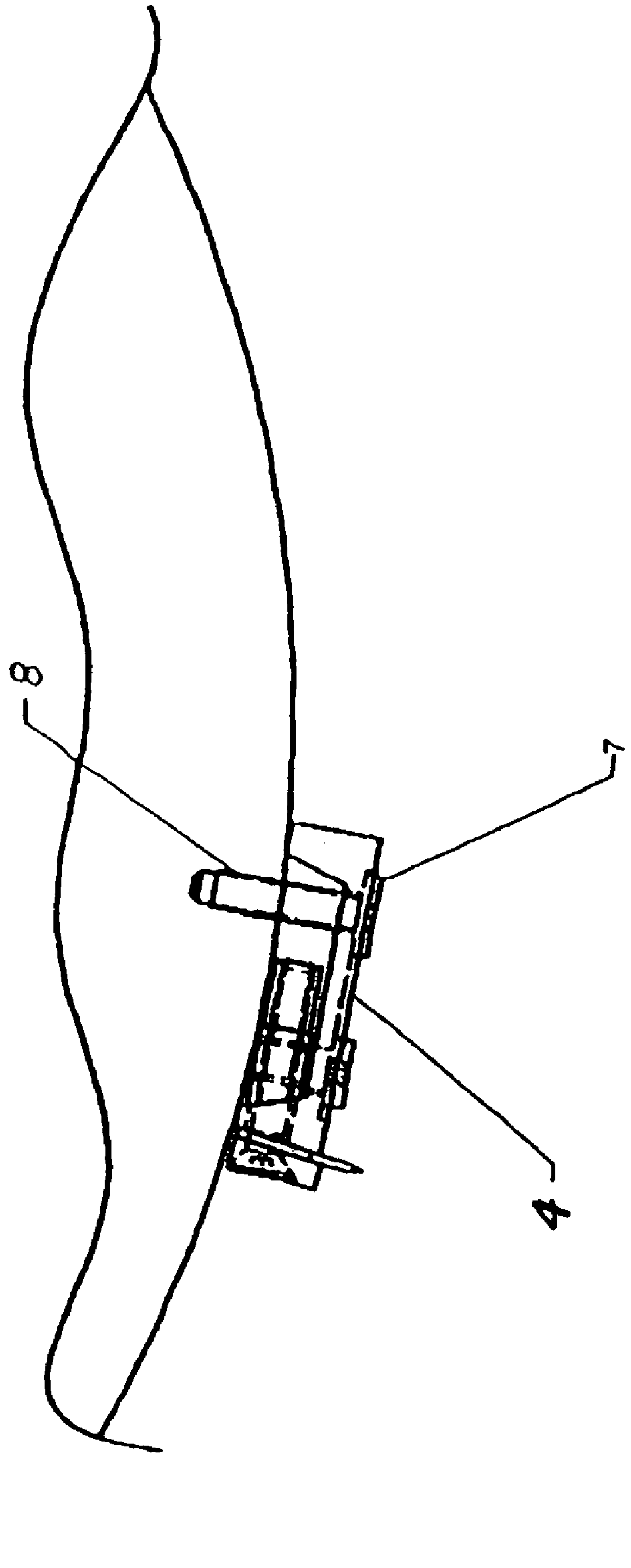
FIG. 2 is a sectional view of an embodiment of the knife holder assembly mounted on the knife cylinder.

Referring to FIG. 1, there is shown a schematic diagram of a rotary cutter having a knife cylinder 1, and anvil cylinder 2. The web material 3 is shown passing between the nip formed between the two cylinders. A pair of the single knife holder assemblies 4 are shown in FIG. 1 attached to the knife cylinder 1. The knife holder assembly 4 is preferably sized for use on a discrete section of the knife cylinder. Alternatively, the knife holder assembly 4 may be sized to cover greater portions of the knife cylinder 1, and numerous individual knife holder assemblies 4 may be mounted on the knife cylinder. Rubber cushioning (not shown) may also be employed on the surface of either cylinder to facilitate the driving of the web through the cylinders and to keep the web taut while it is cut. The knife cylinder has a plurality of receiving holes 8 (see FIG. 2), which are preferably threaded holes, positioned in a uniform matrix or array about its outer surface. FIG. 2 shows single-knife holder assembly 4 mounted on the knife cylinder 1. A long screw 7 (shown partially in phantom) is screwed into one of the threaded holes 8 to secure the holder to the knife cylinder 1.

Figure 3:
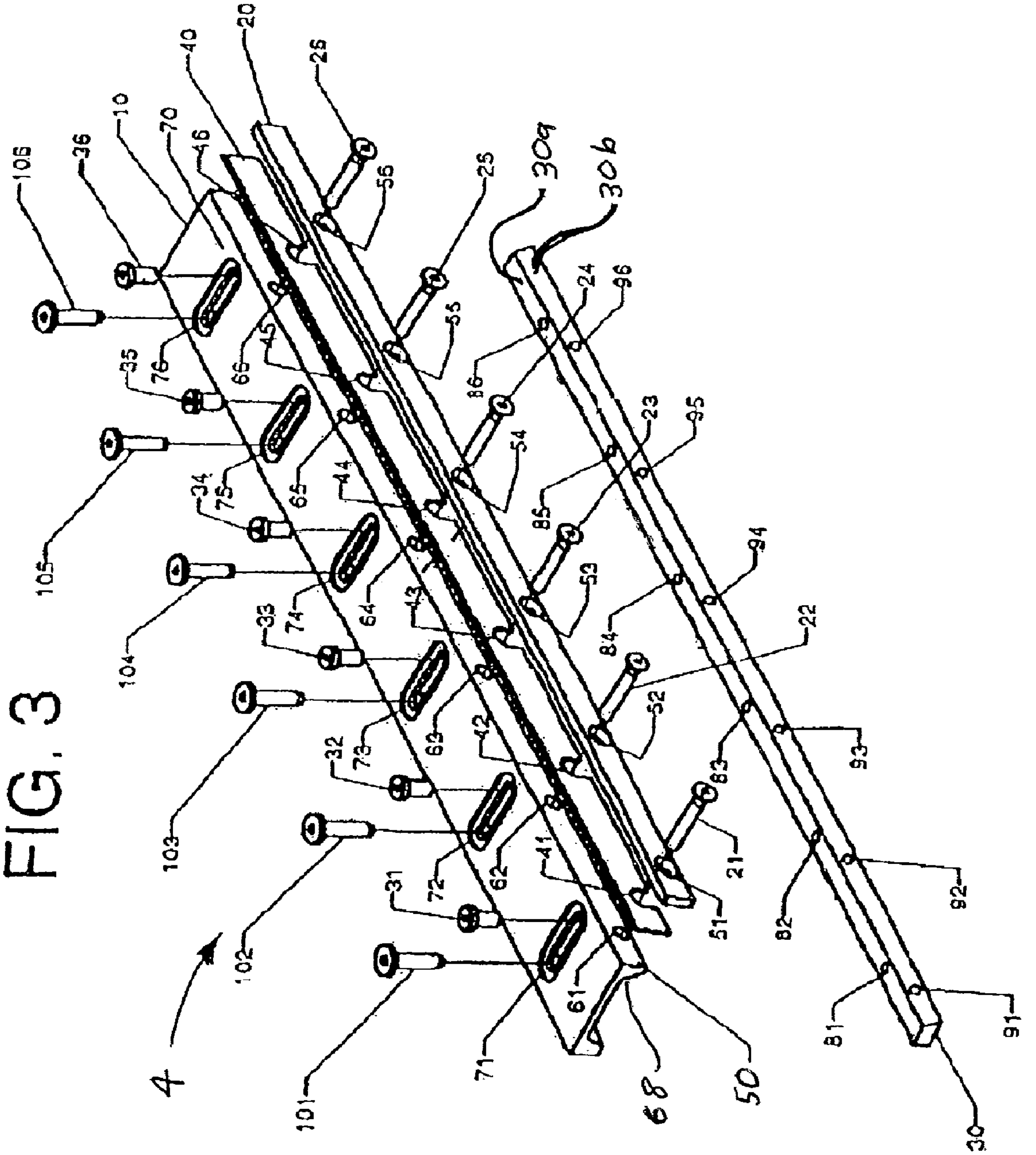
FIG. 3 is an exploded perspective view of a single knife embodiment of the invention.
Figure 4:
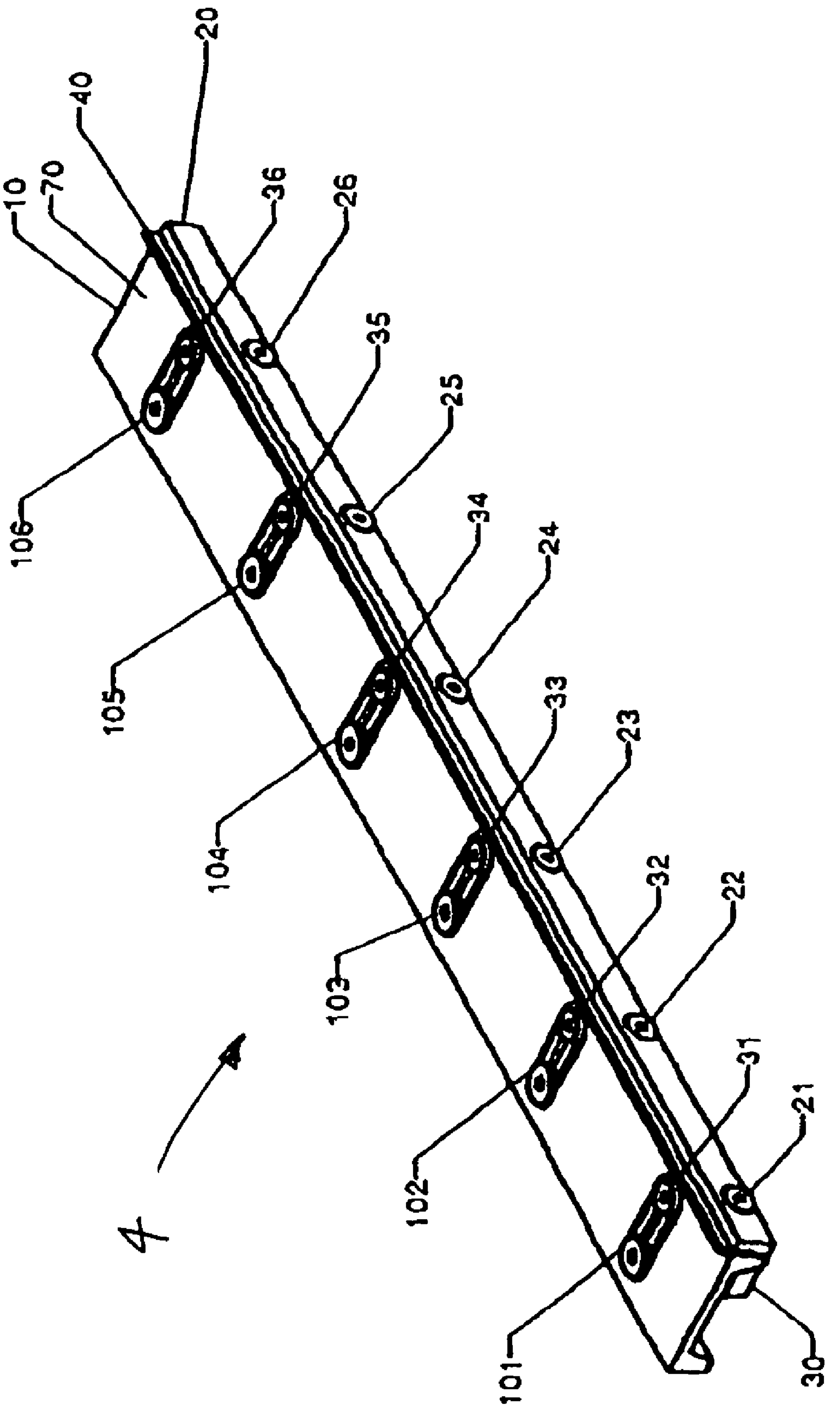
FIG. 4 is a perspective view of the embodiment of FIG. 3 in the assembled position.

Referring to FIGS. 3 and 4, aid an exploded perspective view and an assembled view of the single-knife holder assembly 4, respectively, is shown. The knife holder assembly 4 includes a holder 10, backing bar 20, adjusting member 30, screws 31-36, fasteners 21-26, and cutting rule or knife 40. The embodiment of the holder 10 shown in the figures is made of a 0.44×1.50 inch steel channel member having a 13.38 inch length. The top portion 70 of the holder 10 also has attachment slots 71-76 for allowing the holder 10 to be positioned upon or fastened to a knife cylinder 1, as shown in FIG. 2. The attachment slots 71-76 also allow screws 31-36 to pass through to adjusting member 30.

Figure 7:
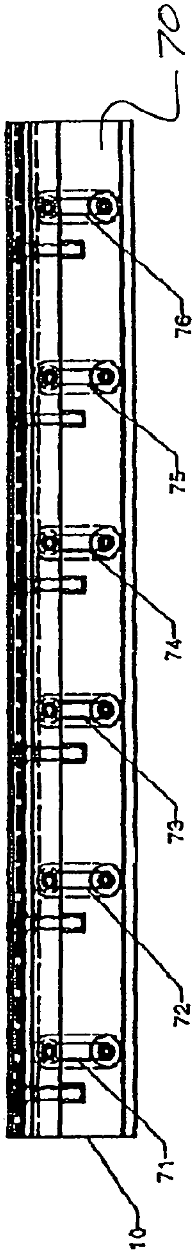
FIG. 7 is a bottom view of the knife holder assembly of FIG. 3.
Figure 8:
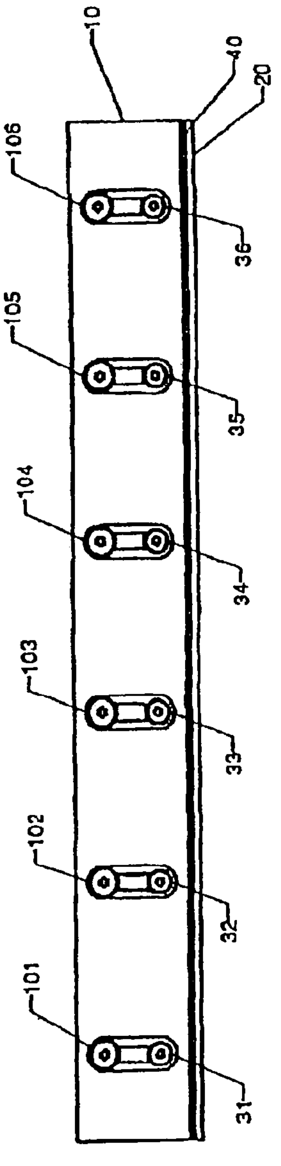
FIG. 8 is a top view of the knife holder assembly of FIG. 3.
Figure 11:
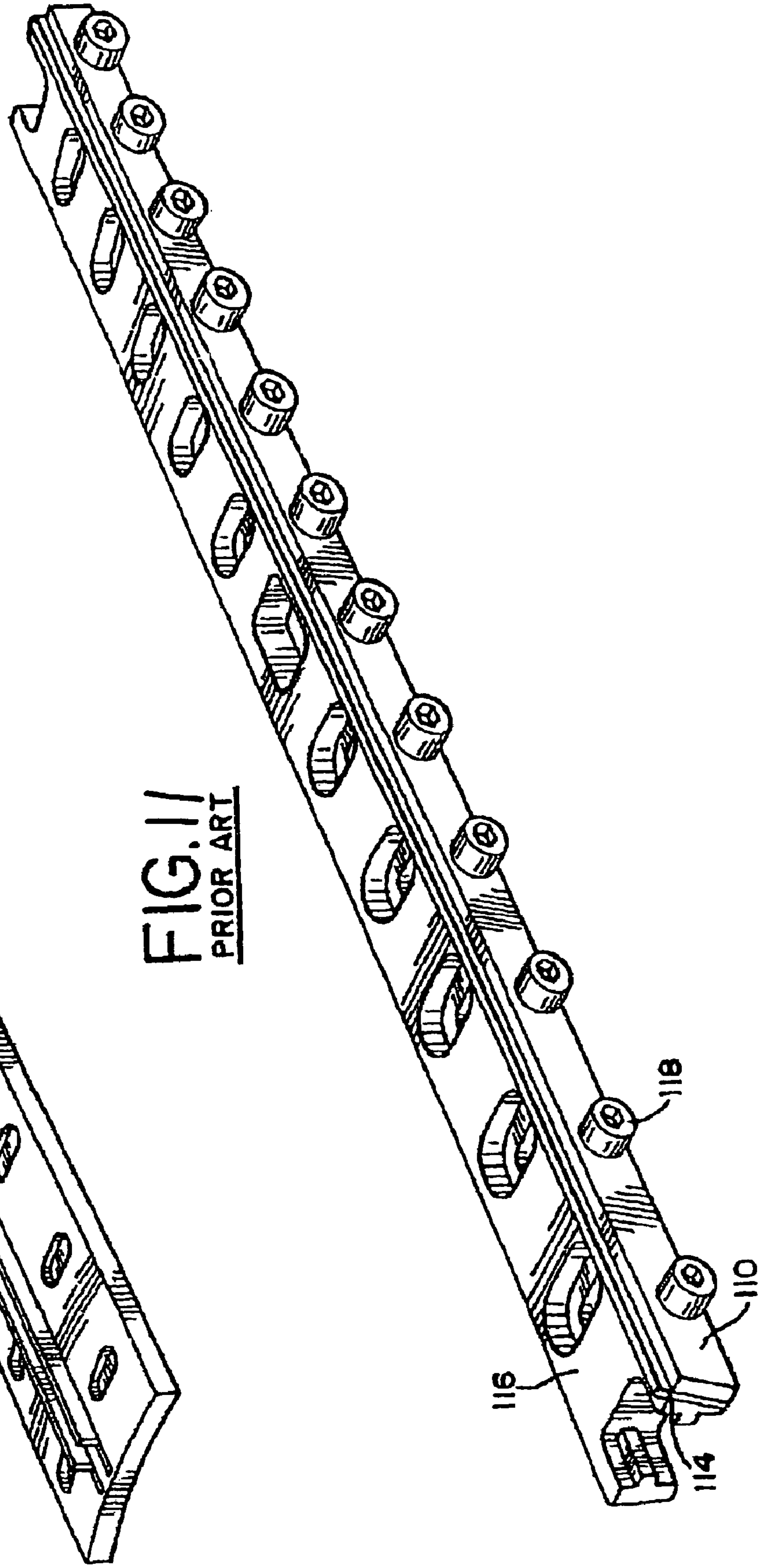
FIG. 11 PRIOR ART
FIG. 11 is a perspective area of an existing knife holder assembly with side mounted screws.
Figure 10:
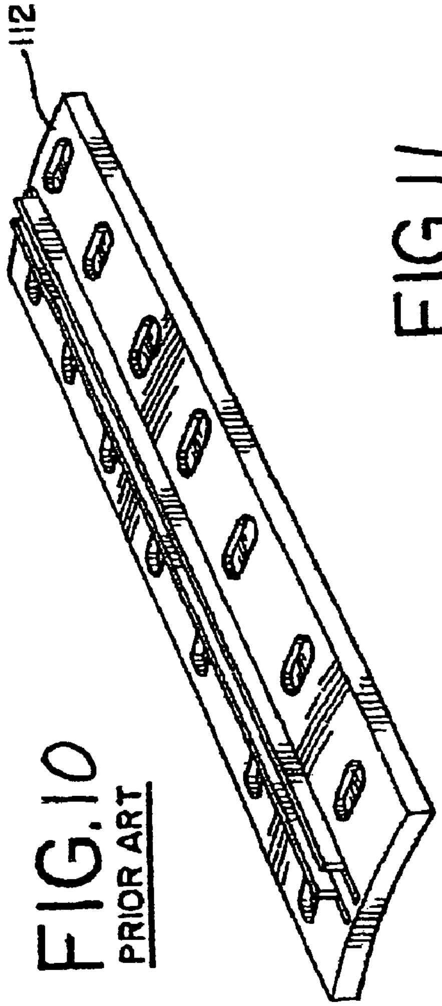
FIG. 10 PRIOR ART
FIG. 10 is a perspective view of an existing epoxy knife holder assembly.
Figure 12:
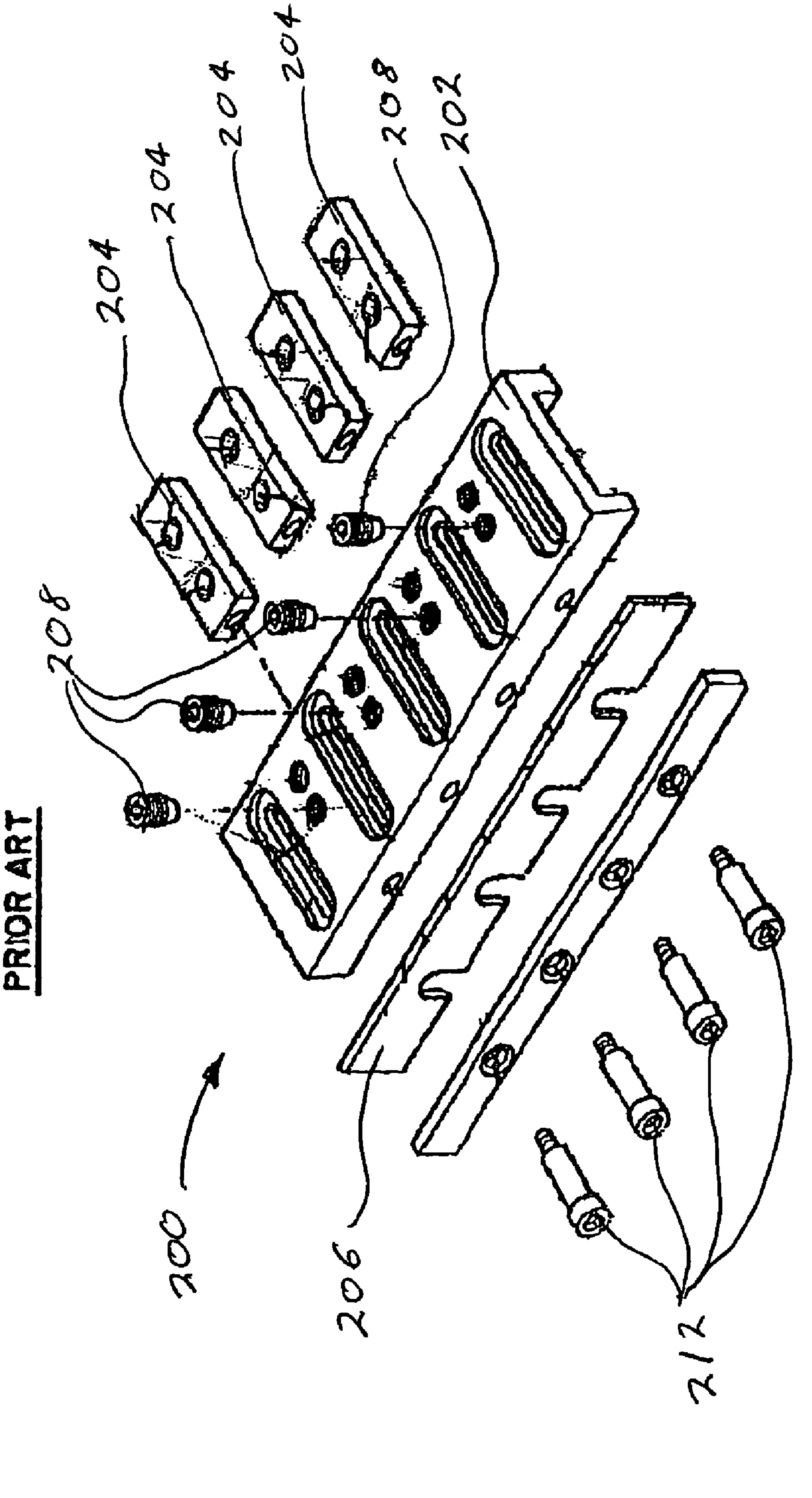
FIG. 12 PRIOR ART
FIG. 12 is a perspective area of an existing knife holder assembly of the type described in U.S. Pat. No. 5,893,314.

Referring to FIG. 7, a bottom view of the top portion 70 of the holder 10 is shown. The slots 71-76 preferably have an inner opening with a 0.206 inch width and an outer opening with a 0.436 inch width.

Figure 6:
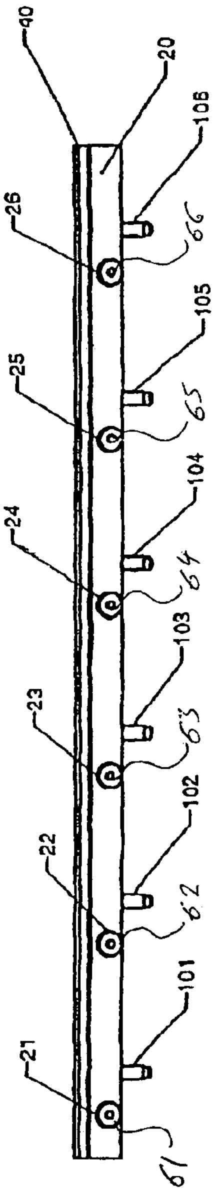
FIG. 6 is a side view of the knife holder assembly of FIG. 3.

Referring to FIG. 6, a side view of the knife holder 10 is shown. The side portion of the knife holder 10 has a length that is preferably 13.38 inches and a width of 0.44 inches. The side portion openings 61-66, into fasteners screws 21-26 are disposed (see FIG. 3), are centered at 0.278 inches from the top edge of the side portion 61-66 and are spaced 2.23 inches from their centers.

Figure 5:
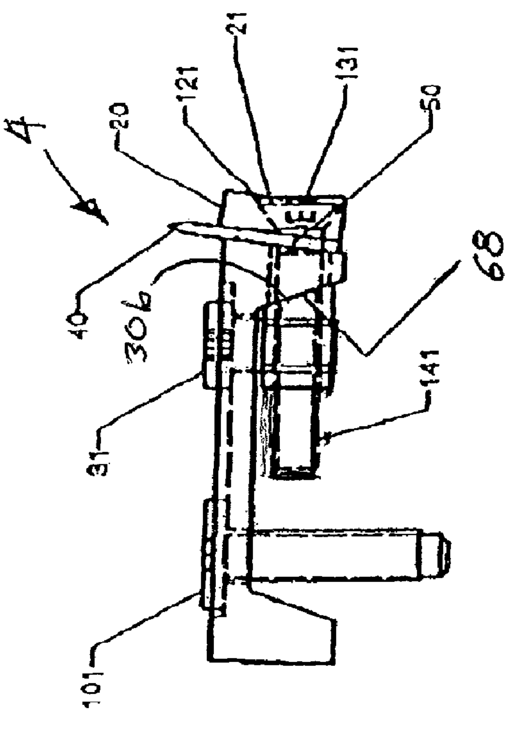
FIG. 5 is a sectional view of the knife holder assembly of FIG. 3.

Referring to FIGS. 3 and 5, the side portion of the knife holder 10 has an outer side portion 50 which is preferably angled 7° degrees from the vertical to position the knife 40 for optimum cutting on knife cylinders with diameters ranging between 24 and 50 inches. The backing bar 20, shown in FIG. 3, has a length of 13.38 inches, a width of 0.44 inches and a depth of 0.125 inch. The openings 51-56 are aligned with the side portion openings 61-66. As shown in FIG. 5, the backing bar openings 51-56 have recessed area 121 surrounding the openings, and both the opening and recessed area are angled at 7° degrees to allow the backing bar 20 to uniformly hold the knife 40 to the angled outer side portion 50. The fastener 26 has a cap portion 131 and screw portion 141. The cap portion 131 fits in the recessed area 121 around the backing bar member openings 51-56. The screw portion 141 fits through these openings 51-56. The knife 40 has notches 41-46 which maintain the 7° degree alignment of the knife with the outer side portion 50.

As shown in FIG. 3, the adjusting member 30 has a length of 13.38 inches, a width of 0.375 inch and a thickness of 0.25 inch. The top side **30*a* of the adjusting member 30 includes a set of adjusting member openings 81-86 have 0.19 inch diameters (10-24 threaded holes) and generally aligned with the slots 71-76 when the knife holder assembly is in the closed position as shown in FIG. 4. The side face 30*b* of the adjusting member 30 also has screw holes 91-96 that are designed to receive the screw portion 141 of the fasteners 21-26**.

Figure 9:
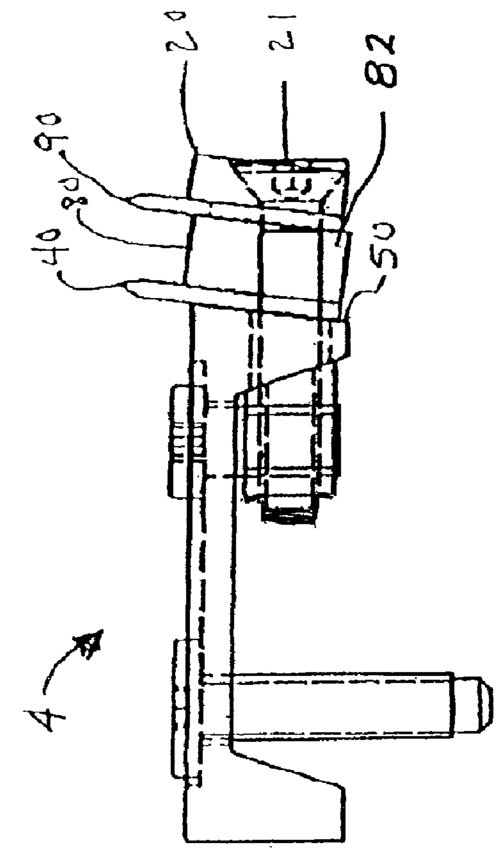
FIG. 9 is a sectional view of a double knife holder embodiment of the invention.

Referring to FIG. 9, a double knife embodiment 4' is shown. A spacer 80 is inserted between the first knife 40 and a second knife 90. The spacer 80 has a length of 13.38 inches, a width of 0.44 inch and a thickness that may be varied to achieve a desired distance between the knives. The spacer 80 includes notched openings 82 that are angled at 7° degrees to the horizontal to allow the spaced knives 40, 90 to be uniformly clamped between the backing bar 20 and the outer side portion 50.

The inner side portion 68 of the holder 10 and the side face **30*b* of the adjusting member 30 are both angled and substantially parallel to each other. When the rotary cutting machine is shut down for maintenance, the operator would typically uses a hex wrench to loosen or remove the screws 31-36 from, for example, the openings 71-76, as shown in FIGS. 3-5. This, in turn, allows the adjusting member 30 with attached fasteners 21-26 to translate or move toward the outer side portion 50 to thereby loosen the clamped knife 40. The operator may then replace the worn knife 40 with a new knife by aligning the notches 41-46 of the knife with the screw portion 141 of the fasteners 21-26 and setting the knife onto the screw 141 of each of the fasteners. The operator may then easily and rapidly tighten the screws 31-36 using the hex wrench which moves the adjusting member 30 and attached fasteners 21-26 away from the outer side portion 50. The cap portion 131 of the 21-26** fasteners retains the backing bar against the knife and clamps it to the outer side portion. The rotary cutting operation can then be resumed.

Alternatively, as shown in the embodiment of FIG. 9, the operator may place a spacer 80 and a second knife 90 onto the screw portion 141 of the fasteners 21-26. The spacer 80 may have a desired thickness to achieve the desired spacing between knifes 40 and 90. The embodiments described herein may be used for a 24-50 inch diameter knife cylinder.

In addition, urethane strips (not shown) with a 3/16 inch thickness, for example, may be inserted on either side of the knives 40, 90 to decrease the wear on the knife blade. The urethane strips preferably have openings formed therein to fit onto the screw of the fasteners 21-26, and are placed on both sides of the knife or knives.

Figure 13:
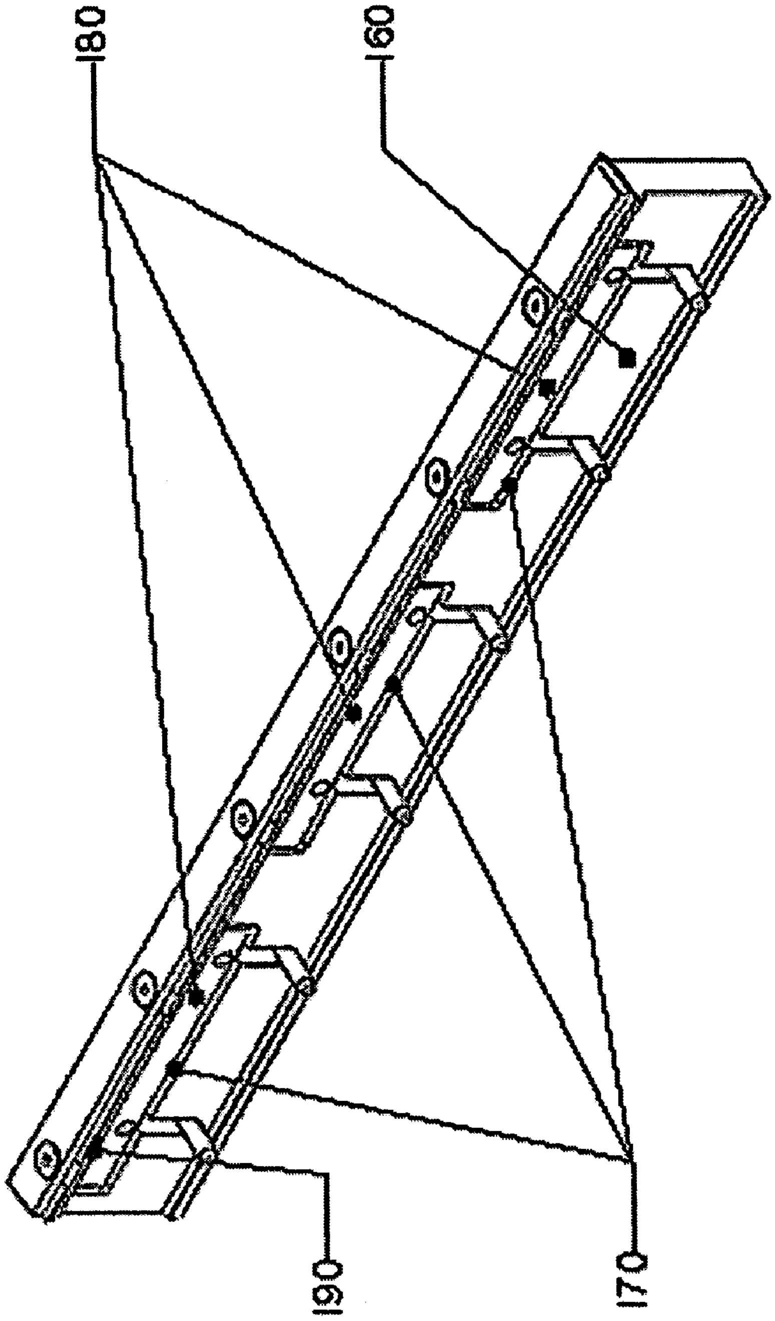
FIG. 13 is a bottom perspective view of a knife holder assembly with three separate backing bars.

In addition, as shown in the embodiment in FIG. 13, cavities 170 may be milled or formed in the bottom of the knife holder assembly 160 to accommodate separate backing bars 180. Separate backing bars are helpful for making more precise adjustments to the position of the cutting rule 190.

It is therefore intended that the foregoing detailed description be regarded as illustrative rather than limiting, and that it be understood that it is the following claims, including all equivalents, that are intended to define the spirit and scope of this invention.

The invention claimed is:

1. A knife holder apparatus comprising:

a holder including a top portion, a side portion, a top portion opening formed through the top portion, and a side portion opening formed through the side portion, the side portion of the holder comprising an angled inner side;

a fastener extending through the side portion opening and comprising a cap portion configured to engage and secure a cutting knife to an exterior surface of the holder;

a backing bar attached to the fastener; and an adjusting member including a top portion and a tapered side portion, the tapered side portion attached to the fastener and configured to engage the angled inner side of the holder so as to provide a clamping force between the cap portion and the exterior surface of the holder, an opening formed in the top portion of the adjusting member aligned with the top portion opening of the holder.

2. The apparatus of claim 1 wherein the top portion opening comprises a slot formed through the top portion of the holder to allow the holder to be fastened to a knife cylinder.

3. The apparatus of claim 1 wherein the fastener is screwably attached to the tapered side portion of the adjusting member.

4. The apparatus of claim 1 further comprising a knife for inserting on to the fastener.

5. The apparatus of claim 4 wherein the knife includes a notch for fitting on to the fastener.

6. The apparatus of claim 5 wherein the fastener has a cap portion to retain the knife.

7. The apparatus of claim 1 further comprising a second fastener for inserting through the top portion opening of the holder and the top portion opening of the adjusting member.

8. The apparatus of claim 7 wherein the second fastener comprises a screw and the top portion opening of the adjusting member has threaded sidewalls for receiving the screw.

9. The apparatus of claim 1 wherein the interior surface of the holder comprises a tapered inner side portion configured to engage the tapered side portion of the adjusting member, further wherein the tapered inner side portion of the holder and the tapered side portion of the adjusting member have substantially the same angle.

10. The apparatus of claim 1 wherein the holder comprises a modified stock beam channel.

11. The apparatus of claim 1 wherein the backing bar includes an opening formed through the backing bar, the fastener extending through the backing bar opening, the fastener including a cap portion to retain the backing bar.

12. The apparatus of claim 1 further comprising a first knife and second knife positioned on the fastener, and a spacer positioned between the first and second knife.

13. The apparatus of claim 1 further comprising a urethane strip positioned on the fastener.

14. A knife holder apparatus comprising:

a holder including a top portion and a side portion, the side portion comprising an exterior surface configured to engage a cutting knife, an angled interior surface, and a top portion opening formed through the top portion;

a fastener inserted in through the top portion opening of the holder; and an adjusting member including a tapered side portion, a top portion and an opening formed in the top portion, the tapered side portion configured to engage the angled interior surface of the side portion of the holder, the opening of the adjusting member aligned with the top portion opening of the holder to allow the fastener to be inserted through the top portion opening of the holder and contact screwably engage the top portion opening of the adjusting member, wherein screwable engagement between the fastener and the top portion opening of the adjusting member causes the tapered side portion of the adjusting member to engage the interior surface of the holder, further wherein engagement between the adjusting member and the interior surface of the holder is configured to provide a clamping force sufficient to secure a cutting knife against the exterior surface of the holder.

15. Apparatus for supporting a cutting knife disposed on a rotary die cutting machine comprising:

a holder including a top portion and a side portion, a plurality of top portion openings being formed through the top portion, a plurality of side portion openings being formed through the side portion, the side portion of the holder comprising an angled inner side;

an adjusting member positioned under an interior surface of said top portion and adjacent to an interior surface of the side portion of said holder, the adjusting member having a tapered side portion configured to engage the angled inner side of the side portion of the holder, the adjusting member having a plurality of top openings aligned with the top portion openings of the holder, the adjusting member having a plurality of side openings aligned with the side portion openings of the inner side portion;

a backing bar configured to engage and secure a cutting knife to an exterior surface of the side portion of the holder, a plurality of backing bar openings formed through the backing bar, each of the backing bar openings aligned with the side openings in the adjusting member;

a plurality of side fasteners each having a screw portion and a cap portion, said screw portions of the side fasteners slidably extending through the backing bar openings and the side portion openings, the screw portions connected to the side openings in the adjusting member, the cap portions engaging the backing bar; and a plurality of top fasteners extending through the top portion openings of the holder and movably engaging with the top openings of the adjusting member, wherein movement of the fasteners into the top openings of the adjusting member moves the adjusting member towards the top portion of the holder, wherein the tapered side portion is configured to move the adjusting member away from the exterior surface of the side portion of the holder upon movement of the adjusting member towards the top portion of the holder so as to provide a clamping force between the backing bar and the side portion of the holder.

16. The apparatus of claim 15 wherein the plurality of top portion openings comprise a plurality of slots formed through the top portion of the holder.

17. A knife holder comprising:

a holder including a top portion, a side portion, a top portion opening formed through the top portion, and a side portion opening formed through the side portion, the side portion of the holder comprising an angled inner side;

a fastener extending through the side portion opening and comprising a cap portion configured to engage and secure a cutting knife to an exterior surface of the holder:

a spacer bar disposed adjacent to the side portion of the holder, the spacer bar having a notch configured to fit over the fastener; and an adjusting member including a top portion and a tapered side portion, the tapered side portion attached to the fastener and configured to engage the angled inner side surface of the holder so as to provide a clamping force between the cap portion and the exterior surface of the holder, an opening formed in the top portion of the adjusting member aligned with the top portion opening of the holder.

18. The apparatus of claim 1 further comprising at least one urethane strip clamped between the side portion and the backing bar.

19. The apparatus of claim 1 wherein the tapered side portion of the adjusting member is engaged with the interior surface of the holder by a second fastener inserted through the top portion opening of the holder and screwably engaged with the top portion opening of the adjusting member.

* * * * *

UNITED STATES PATENT AND TRADEMARK OFFICE

CERTIFICATE OF CORRECTION

PATENT NO. : 7,900,542 B2
APPLICATION NO. : 10/966127
DATED : March 8, 2011
INVENTOR(S) : Paul G. Kapolnek It is certified that error appears in the above-identified patent and that said Letters Patent is hereby corrected as shown below:

In column 6, claim 14, line 41, before “screwably engage the top portion” delete “contact”.

Signed and Sealed this
Twenty-eighth Day of June, 2011

David J. Kappos

*Director of the United States Patent and Trademark Office*

UNITED STATES PATENT AND TRADEMARK OFFICE

CERTIFICATE OF CORRECTION

PATENT NO. : 7,900,542 B2
APPLICATION NO. : 10/966127
DATED : March 8, 2011
INVENTOR(S) : Kapolnek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this
Eleventh Day of September, 2012

David J. Kappos
*Director of the United States Patent and Trademark Office*